United States Patent [19]

Holmes et al.

[11] 4,081,333
[45] Mar. 28, 1978

[54] METHOD AND APPARATUS FOR DISTILLATION

[75] Inventors: William Samuel Holmes, Compton; Edward James Lowe, Stourton, nr. Stourbridge; Ernest Reginald Brazier, Maidenhead, all of England

[73] Assignee: Albright & Wilson Limited, Warley, England

[21] Appl. No.: 639,694

[22] Filed: Dec. 11, 1975

[30] Foreign Application Priority Data

Dec. 19, 1974 United Kingdom ............... 55010/74

[51] Int. Cl.² .............................................. B01N 3/02
[52] U.S. Cl. ..................................... 203/86; 203/100; 202/235; 423/322; 159/DIG. 42

[58] Field of Search ................... 202/233–235, 202/219; 203/100, 186; 423/322; 23/290.5, 264, 294; 266/39, 43; 432/264; 220/63 R; 159/DIG. 42, DIG. 23

[56] References Cited

U.S. PATENT DOCUMENTS

| 18,134 | 9/1957 | Coates | 202/219 |
| 1,984,674 | 12/1934 | Fiske et al. | 423/322 X |
| 2,150,261 | 3/1939 | Blackwell et al. | 423/322 X |
| 2,153,953 | 4/1939 | Burke | 23/264 |

Primary Examiner—Hiram H. Bernstein
Attorney, Agent, or Firm—Flynn & Frishauf

[57] ABSTRACT

Phosphorus is recovered from phosphorus mud by introducing a skip of phosphorus mud into a furnace, closing the furnace and contacting the skip inside the furnace with a pool of molten lead. Phosphorus vapour is distilled from the mud and recovered.

6 Claims, 1 Drawing Figure

U.S. Patent   March 28, 1978   4,081,333
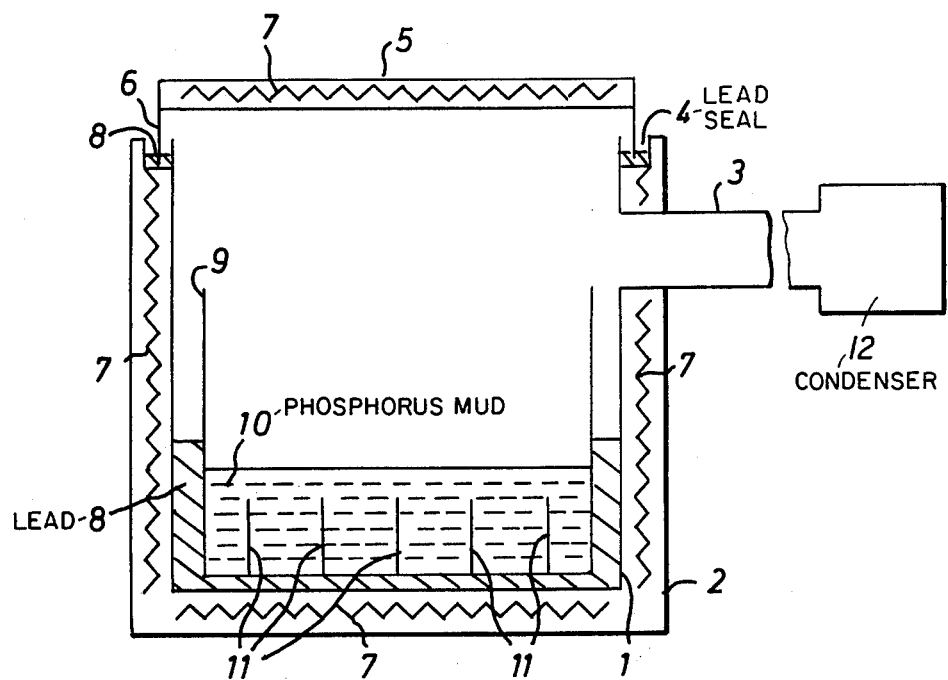

METHOD AND APPARATUS FOR DISTILLATION

The present invention relates to a method and apparatus for distillation which is of particular use for the recovery of phosphorus from phosphorus mud.

Phosphorus mud is a by-product of thermal phosphorus manufacture which is obtained when entrained solids are scrubbed from the waste gases. It usually contains a significant but variable proportion of phosphorus, which may be recovered from the mud by distillation, together with involatile solids which remain as a residue.

Distillation of phosphorus from the mud, however, presents problems. It is possible to use rotary kilns, but they present difficulties in achieving a satisfactory seal and are insufficiently flexible. The residence time and temperature in a rotary kiln cannot be varied sufficiently to allow for the variability in composition of phosphorus mud, which requires different conditions of heating from batch to batch.

If mud is charged to a batch furnace, the furnace has to be allowed to cool after each charge has been heated, and the residue must then be removed, which often presents difficulties due to the intractable nature of the residue. Moreover phosphorus condensed on the walls and lid of the furnace ignites when the furnace is opened causing a considerable volume of irritant and harmful fumes.

Batch furnaces also present heating problems. If the furnace is heated externally, difficulties of heat exchange arise. Cheap thermally conductive materials such as steel are readily corroded at the operating temperatures of the furnace, whereas lagged refractory furnaces are difficult to heat sufficiently. Internal heating elements would be fouled by the residual solid which would be particularly difficult to remove.

We have now devised a method and apparatus for distilling phosphorus mud whereby at least some of the foregoing disadvantages of the prior art methods may be alleviated.

The invention provides distillation apparatus comprising a furnace adapted to receive a skip for containing phosphorus mud and provided with an aperture through which the skip may be inserted or removed, means for closing the aperture with a vapour tight seal, lead in the base of the furnace adapted, when the furnace is heated, to provide a pool of molten lead capable of transferring heat from the inner surface of the furnace to the base of the skip, means for heating the furnace, and a conduit adapted to conduct phosphorus vapour from the furnace to a condenser.

According to a further embodiment our invention provides a method for recovering phosphorus from phosphorus mud which comprises introducing a charge of the mud in an open thermally conductive vessel into a furnace provided with an aperture for introducing the vessel into the furnace and an outlet for phosphorus vapour, contacting the vessel with a reservoir of lead in the furnace, closing the aperture with a vapour-tight enclosure, heating the lead, before or after insertion of the mud, to a temperature above the melting point thereof and sufficient to distill phosphorus from the mud, continuing the heating until at least a substantial proportion of the phosphorus has distilled therefrom, and withdrawing the phosphorus vapour through the outlet.

The invention has the advantage that it permits the skip of phosphorus mud to be removed easily and quickly from the furnace as soon as the distillation has been completed, without the need to allow the furnace to cool.

The molen lead ensures rapid and efficient heat transfer from the furnace to skip. An advantage of the improved heat transfer is that it permits the furnace to be constructed of convenient materials such as mild steel without scaling damage, since it does not require heating to such high temperatures as would be required if the lead were absent. It is this improved heat transfer which enables the mud to be indirectly heated in the skip, rather than being directly heated by an element in the furnace.

Preferably the aperture in the furnace is closed by by means of a lid having a flange round the circumference adapted to fit into a channel around the aperture which is capable of holding liquid so as to form, when the flange fits into the channel, a vapour-tight liquid seal. It is possible to use water to provide the seal, in which case the temperature of lid and and of the upper sides of the furnace should not be permitted to rise sufficiently high to cause the water in the channel to boil.

According to a preferred embodiment of the invention the seal is formed by molten lead. Preferably therefore the channel contains sufficient lead to form the seal and is provided with means for heating the lead above its melting point. An advantage of using a molten lead seal is that it permits the lid and sides of the furnace to be heated sufficiently to prevent phosphorus condensing on their interior surfaces. Preferably, therefore, the lid and/or the sides of the furnace are provided with means for heating said interior surfaces above the boiling temperature of phosphorus.

Preferably the furnace is heated from below by electrical heating elements, although any other heating means capable of achieving the desired temperatures are permissible, e.g. gas, coke, oil or inductive heating, The heating is preferably such as to raise the temperature of the reservoir of lead in the furnace above its melting point of about 327° C and preferably up to from 330° to 620° C e.g. 400° to 600° C. Below about 400° C it is difficult to distil phosphorus from the mud at an acceptable rate. Above 620° C there is risk of scaling or similar thermal corrosion unless expensive heat and corrosion resistant materials are employed in the construction of the furnace.

The lid and/or the sides of the furnace are preferably heated by means of electrical elements, although other heating means may be used. Where a molten lead seal is used, the temperature of the lid and sides is maintained above 300° C, preferably above 330° C e.g. 350° to 450° C.

The maximum temperature and duration of heating of the mud may vary considerably from batch to batch. Preferably the temperature of the lead and of the mud are monitored to enable the onset and completion of the distillation to be detected. Alternatively or additionally the distilled phosphorus may be observed directly by means for example of a vapour sampling valve at the vapour outlet, or by observing the phosphorus condensed. Heating is generally continued until substantially all the phosphorus has been recovered.

The phosphorus vapour passes from the vapour outlet, preferably through a lagged or heated conduit to the condenser. Any suitable conventional type of condenser may be employed, e.g. a water cooled tube. Preferably the vapour is condensed by direct scrubbing with water.

As soon as the heating is completed, the furnace may be opened up and the skip of treated mud removed. The furnace is then ready for the insertion of a fresh skip of mud.

The skip is desirably an open vessel of a thermally conductive material such as mild steel. It is preferably shaped so as to fit snuggly within the furnace. The interior surfaces of the skip are preferably provided with vanes or fins to aid heat transfer into the interior of the mud.

Apparatus according to the invention will now be described with reference so the accompanying drawing which is a diagramatic elevation of a furnace according to the invention.

The furnace comprises an open mild steel vessel 1 whose sides are surrounded by lagging. 2 The vessel 1 is provided with a vapour outlet 3. The top of the vessel 1 is surrounded by a channel 4. A lid 5 has a flange 6 adapted to fit into the channel 4. The base and sides of the vessel, the channel 4 and the lid 5 are each provided with electric heating elements 7. The vessel 1 and the channel 4 each contain a supply of lead 8, sufficient to provide, when heated above its melting point, a pool of liquid covering the base of the vessel 1 and a liquid seal in the channel 4.

When in use the furnace contains a mild steel skip 9 containing phosphorus mud 10, which fits inside the vessel 1. The base of the skip 9 is provided with heat transfer fins 11 on its interior surface. A lagged conduit (not shown) leads from the vapour outlet 3 to a condenser 12.

The invention is illustrated by the following examples in which a furnace as described herein with reference to the drawing was used:

EXAMPLE 1

415 kg of mud were melted in the skip and transferred when cold into the furnace containing molten lead at 450° C. The furnace lid was replaced and the furnace was then heated to raise the contents of the skip to 600° C. On attainment of this temperature the vapour was periodically examined for phosphorus content and when judged to be sufficiently low the lid was removed from the furnace and the hot skip removed. 144 kg of phosphorus was recovered during the heating process and 37 kg of inert residue was removed in the skip. Heating time 14 hours. Solvent extractable phosphorus in the residue was < 1 ppm.

EXAMPLE 2

In a similar way to example 1, 258 kg of another mud was loaded into the furnace containing molten lead at 560° C, the furnace was closed with the lid and the skip contents heated to 600° C. 99 kg of phosphorus was recovered and 67 kg of residue. The phosphorus content of the residue was similar to example 1. The heating time was 7 hours.

EXAMPLE 3

In a similar way to Example 1 and 2, 565 kg of another mud was heated, 123 kg of phosphorus was recovered and 75 kg of residue obtained. The heating time was 13 hours.

EXAMPLE 4

In a similar way 314 kg of an effluent pond sludge was heated, 3 kg of phosphorus was recovered with 41 kg of residue. The heating time was 10 hours.

The residues from 1, 2 and 3 were fine black powders. Residue from 4 consisted of easily broken greay lumps. All solids were easily discharged from the skip and were inert.

The balance of the materials in runs 1 to 4 was water.

We claim:

1. A method for distilling phosphorus from phosphorus mud formed when entrained phosphorus-containing solids are scrubbed from the waste gases of a thermal phosphorus plant comprising positioning phosophorus mud in an open thermally conductive vessel, providing a distillation furnace having a heating zone and an exposed lead in the bottom of said heating zone, positioning said vessel in said heating zone and in direct contact with molten lead, heating said molten lead whereby said vessel and the phosphorus mud contained therein are heated to distill phosphorus from said mud as phosphorus vapour, and recovering said phosphorus vapour from said heating zone.

2. A method as claimed in claim 1 wherein the temperature of the molten lead is maintained between 330° and 620° C.

3. A method as claimed in claim 2 wherein the molten lead is maintained at a temperature of between 400° and 600° C.

4. Apparatus for distilling phosphorus from phosphorus mud, said phosphorus mud being solids formed when entrained phosphorus-containing solids are scrubbed from the gases of a thermal phosphorus plant, comprising a furnace having an interior surface and an aperture for insertion therein and removal of an open vessel containing phosphorus mud, said aperture being surrounded by a substantially horizontal channel.

means for closing the aperture with a vapour-tight seal comprising a lid and a flange around the circumference of said lid adapted to fit within said channel, and said channel containing lead in an amount sufficient to form a vapour-tight molten lead seal with said flange, and means for heating said lead in said channel above the melting point thereof, lead in the base of said furnace and exterior of said vessel, means for heating said lead in the furnace to a temperature above the melting point thereof to form a molten lead pool, said vessel when inserted into said furnace contacting said molten lead pool at at least the lower portion of said vessel to conduct heat from the interior of the furnace via said molten lead pool to said vessel, a condenser for phosphorus vapour, and a conduit adapted to conduct phosphorus vapour from the furnace to said condenser.

5. Apparatus as claimed in claim 4 wherein said lid comprises means for heating it above the condensation temperature of phosphorus vapour.

6. Apparatus for distilling the volatile substance from a mixture of said volatile substance and a non-volatile solid material comprising a furnace having an interior surface including a bottom and side walls, and an aperture for insertion therein and removal of an open vessel containing said mixture, said vessel having at least a lower surface and side walls, means for closing the aperture with a vapour-tight seal,
an exposed mass of lead in the base of said furnace and exterior of said vessel,
means for heating said furnace bottom and at least the lower portion of said furnace side walls to heat said mass of lead in the furnace by conduction from said furnace bottom and furnace side walls to a temperature above the melting point thereof to form an exposed molten lead pool,
said vessel when inserted into said furnace contacting said molten lead pool at the lower surface of said vessel and at least at a portion of the sidewalls of said vessel to conduct heat from the interior bottom and side walls of the furnace via said molten lead pool to said vessel,
a condenser for said volatile substance in the vapour state, and
a conduit adapted to conduct said vapour from the furnace to said condenser.

* * * * *